Nov. 10, 1931.  W. B. GOUGHNOUR  1,831,297
WHEEL
Filed Jan. 24, 1930
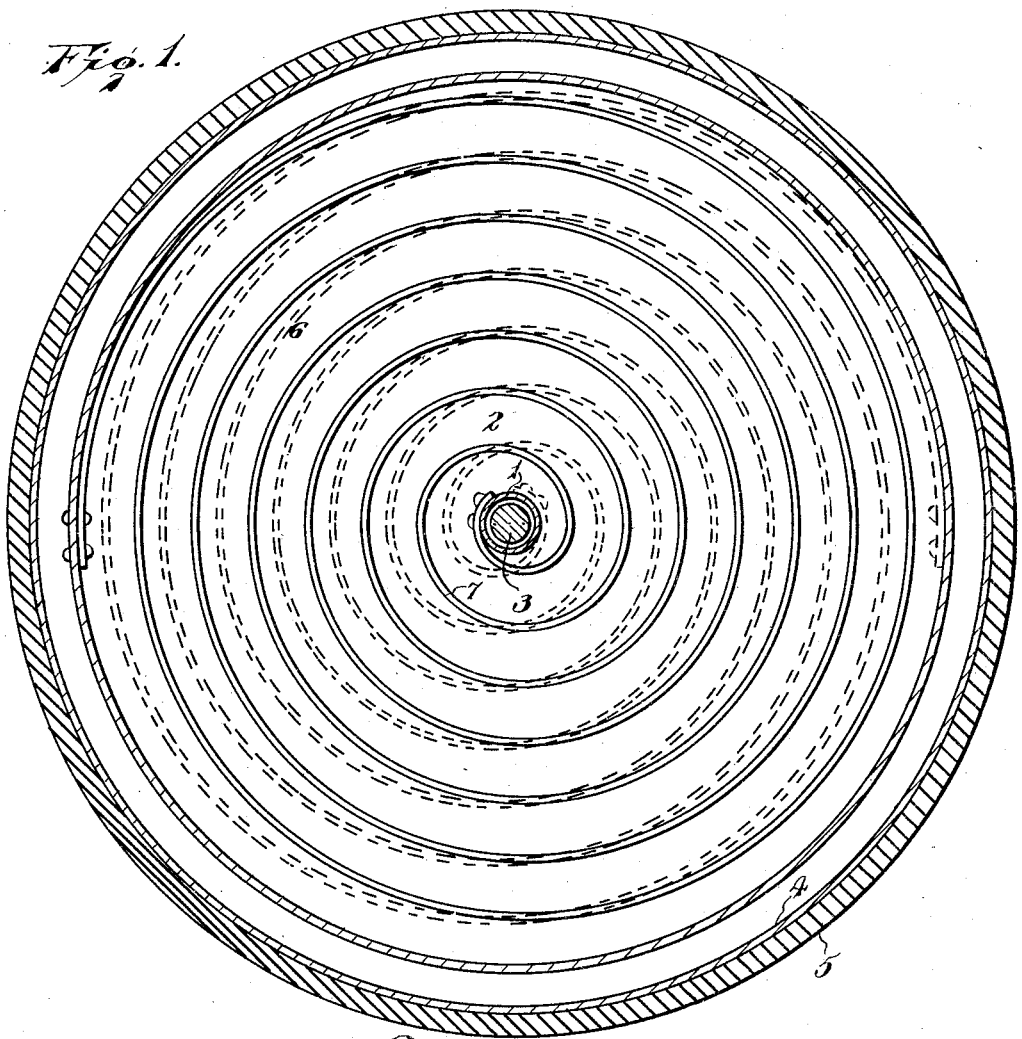
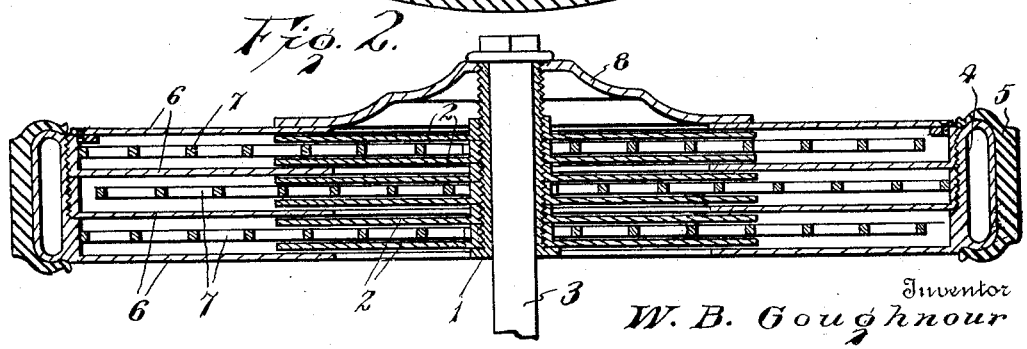
Inventor
W. B. Goughnour
By
Lacey & Lacey,
Attorneys Patented Nov. 10, 1931

1,831,297

UNITED STATES PATENT OFFICE

WALTER B. GOUGHNOUR, OF MANKATO, MINNESOTA, ASSIGNOR OF THIRTY PER CENT TO WILLIAM F. KIRBY, OF KASOTA, MINNESOTA

WHEEL

Application filed January 24, 1930. Serial No. 423,153.

The object of this invention is to provide a wheel structure which will absorb the shocks and vibrations due to travel over a rough surface and will obtain all the advantages attendant upon the use of a pneumatic tire without any of the disadvantages thereof. The invention is illustrated in the accompanying drawings and will be hereinafter fully set forth.

In the drawings:

Figure 1 is a section through a wheel embodying the invention taken in a plane at a right angle to the axis, and Fig. 2 is a diametrical section of the wheel.

In carrying out the present invention, there is provided a hub 1 from which extend disks 2 which are arranged in pairs, as shown. The hub is fitted upon an axle 3 which may be of any approved construction and which may be a driving axle or a dead axle according to whether the wheel is mounted at the front or the rear of a vehicle and whether or not the vehicle is motor propelled. I also provide a rim 4 which may be of any approved construction and upon which a tire 5 is mounted. The tire may be a solid tire and may be of any desired design and may well be formed of otherwise waste material, the exact details of the tire and rim being capable of wide variation. Annular plates 6 extend inwardly from the rim and terminate short of the hub but extend inwardly far enough to overlap the disks 2, as shown in Fig. 2. Disposed between the several plates 6 and between the disks of each pair of disks 2 are volute springs 7 which have their inner ends secured to the hub 1 and their outer ends secured to the rim 4, as will be understood and as shown in Fig. 1. As indicated by the full and dotted lines in Fig. 1, the alternate springs are wound in opposite directions so that they counter-balance and thereby furnish easy riding qualities and most effectually absorb the vibration due to rough travel and maintain the body of the vehicle in a normal position relative to the ground. It will be understood that the springs, the disks and the annular plates may be provided in any desired number according to the surface to which the wheel will be subjected, and in the present illustration there are shown three springs in which event the middle spring will have a tension equal to the tension of the two outer springs so as to effectually balance them and provide the desired even tractive force between the hub and the rim so that the parts will tend to maintain the concentric relation of the axle and the rim.

The disks may be mounted on the hub and the plates on the rim in any manner which will provide the required intimate firm union. In Fig. 2, I have shown the lowest or innermost plate 6 as integral with the rim and the hub as formed with an annular stop shoulder at its lower or inner end. The innermost disk 2 is threaded onto the hub against the stop shoulder and the first spring is then secured in place, the disk having an annular flange encircling the hub and providing a seat for the inner end of the spring. The second disk is then threaded onto the hub to abut the flange of the first disk, and the second plate 6 is then threaded into the rim to abut a shoulder thereon, this plate having a rim or flange against which the third plate abuts. The several disks, springs and plates are thus successively secured in place and the outermost plate is secured by bolts or screws to lugs on the flange of the next preceding plate.

From the foregoing description, taken in connection with the accompanying drawings, it will be seen that I have provided an exceedingly simple and compact wheel which will be sightly and which will have all the resultant easy riding qualities of the usual wheels equipped with pneumatic tires while the disadvantages due to blow-outs and punctures of the pneumatic tire are entirely eliminated. The rim and annular plates being intimately united, the ground-engaging portion of the wheel will be rigid so that it will not break down under strains imposed thereon in use while the disks house the springs and have ample play within the area defined by the inner peripheries of the annular plates to accommodate all shocks to which the wheel will be subjected in use. The annular plates and the disks together completely house the springs so that they will not be subjected to chance blows and will not be apt to pick up sticks or stones which would choke the operation and deform or break the springs. Moreover, the annular plates and disks relieve the wheel of unsightliness so that its appearance will not differ greatly from the appearance of ordinary disk wheels now in general use, and to enhance the attractiveness of the wheel a central covering disk 8 is fitted on the end of the hub and extends to and rests against the outermost plate 6.

Having thus described the invention, I claim:

A wheel comprising a hub, a rim, pairs of disks carried by the hub, annular plates extending inwardly from the rim and overlapping the disks, the peripheries of each pair of disks being disposed between the inner edges of two plates, and volute springs disposed between the disks of the several pairs of disks and having their inner ends attached to the hub and their outer ends attached to the rim, the springs being housed by the disks and the annular plates and the alternate springs being reversely wound.

In testimony whereof I affix my signature.

WALTER B. GOUGHNOR. [L. S.]